US008122017B1

(12) United States Patent
Sung et al.

(10) Patent No.: US 8,122,017 B1
(45) Date of Patent: Feb. 21, 2012

(54) ENHANCED RETRIEVAL OF SOURCE CODE

(75) Inventors: Phil Sung, Saratoga, CA (US); Piaw Na, Saratoga, CA (US)

(73) Assignee: Google Inc., Mountain View, CA (US)

( * ) Notice: Subject to any disclaimer, the term of this patent is extended or adjusted under 35 U.S.C. 154(b) by 464 days.

(21) Appl. No.: 12/212,879

(22) Filed: Sep. 18, 2008

(51) Int. Cl.
*G06F 7/00* (2006.01)
*G06F 17/30* (2006.01)

(52) U.S. Cl. ........ 707/723; 707/735; 707/748; 707/763; 715/210; 715/968; 717/106; 717/140

(58) Field of Classification Search ............ 707/723, 707/735, 736, 748, 763, 770; 715/210, 968; 717/106, 140
See application file for complete search history.

(56) References Cited

U.S. PATENT DOCUMENTS

| 7,613,693 | B1 * | 11/2009 | Na et al. ............... 707/999.003 |
| 2002/0091736 | A1 * | 7/2002 | Wall ....................... 707/513 |
| 2003/0110192 | A1 * | 6/2003 | Valente et al. .............. 707/513 |
| 2005/0216454 | A1 * | 9/2005 | Diab et al. ................... 707/3 |
| 2005/0251536 | A1 * | 11/2005 | Harik ........................ 707/200 |
| 2005/0262056 | A1 * | 11/2005 | Hamzy et al. .................. 707/3 |
| 2006/0225053 | A1 * | 10/2006 | Lakshman et al. ........... 717/140 |
| 2006/0242574 | A1 * | 10/2006 | Richardson et al. ............. 707/3 |
| 2006/0259462 | A1 * | 11/2006 | Timmons ...................... 707/3 |
| 2007/0136658 | A1 * | 6/2007 | Feigenbaum et al. ........ 715/513 |
| 2007/0283328 | A1 * | 12/2007 | Javed et al. .................. 717/127 |
| 2007/0299825 | A1 * | 12/2007 | Rush et al. ..................... 707/3 |

OTHER PUBLICATIONS

Michael Salib—"Starkiller: A Static Type Inferencer and Compiler for Python"—MIT 2004, Electrical Engineering and Computer Science, May 20, 2004 (pp. 1-96).*
Elizabeth Dancy and James R. Cordy—"STAC: Software Tuning Panels for Automatic Control"—CASCON '06—Proceedings of the 2006 Conference of the Center for Advanced Studies on Collaborative Research (pp. 1-15).*
Bajracharya, S., et al., "Sourcerer: A Search Engine for Open Source Code Supporting Structure-Based Search" [online], Oct. 2006 [retrieved on May 23, 2011], 2 pages. Retrieved from the Internet: http://portal.acm.org/citation.cfm?id=1176617.1176671.
Henrich, A., et al., "Supporting Collaborative Software Development by Context-Aware Information Retrieval Facilities" [online], Sep. 2003 [retrieved on May 23, 2011], 5 pages. Retrieved from the Internet: http://www.computer.org/portal/web/csdl/doi/10.1109/DEXA.2003.1232031.
Inoue, K., et al., "Ranking Significance of Software Components Based on Use Relations" [online], Mar. 2005 [retrieved on May 23, 2011], 13 pages. Retrieved from the Internet: http://www.computer.org/portal/web/csdl/doi/10.1109/TSE.2005.38.

(Continued)

*Primary Examiner* — John E Breene
*Assistant Examiner* — Anh Ly
(74) *Attorney, Agent, or Firm* — Fish & Richardson P.C.

(57) ABSTRACT

Methods, systems, and apparatus, including computer program products are provided for indexing tags in source code. Implementations provide an enhanced retrieval of source code, in which a score for each of a plurality of files is derived based on a quantity of references to each file in source code of the remaining plurality of files. A query is received identifying a source code tag. Matching files of the plurality of files that satisfy the query are identified, a ranking of the matching files is generated based on the derived scores, and the ranking is provided.

24 Claims, 3 Drawing Sheets

OTHER PUBLICATIONS

Sindhgatta, R., "Using Lucene to Search Java Source Code" [online], Jan. 2006 [retrieved on May 20, 2011], 9 pages. Retrieved from the Internet: http://onjava.com/pub/a/onjava/2006/01/18/using-lucene-to-search-java-source.html?page=1.

Sindhgatta, R., "Using an Information Retrieval System to Retrieve Source Code Samples" [online], May 2006 [retrieved on May 20, 2011], 4 pages. Retrieved from the Internet: http://www.irisa.fr/lande/icse-proceedings/icse/p905.pdf.

* cited by examiner

ENHANCED RETRIEVAL OF SOURCE CODE

FIELD

This specification relates to ranking files.

BACKGROUND

Text editor applications are used by developers to author source code. Certain editors use indexing functions to map symbols (or "tags"), e.g., function names, global variables, typedefs, defines, or keywords, to portions of source code files where the symbols are defined. The mappings are listed in an index, where each entry in the index includes the name of a symbol, the name of the file where the symbol is defined, and a position within the file where the symbol is defined.

By entering a command to search the index, a user may search for symbol definitions in one or more of the files. When a match is located, the index provides the name of the file or files where the definition of the tag is located and the positions of the definition. The code at an identified position may be output to the user, for example by automatically moving a cursor to that position.

Where developers have access to large code bases, the number of results that are returned for a given symbol definition query may also be quite large. If so, developers must manually sort through each result to select an appropriate tag definition. As the code base grows, an increasingly larger number of results may be returned.

SUMMARY

This specification generally describes ranking files.

In general, one aspect of the subject matter described in this specification may be implemented in methods that include the actions of deriving a score for each of a plurality of files based on a quantity of references to each file in source code of the remaining plurality of files, and receiving a query identifying a source code tag. The method further includes identifying matching files of the plurality of files that satisfy the query, generating a ranking of the matching files based on the derived scores, and providing the ranking. Other embodiments of this first aspect include corresponding methods, apparatus, and computer program products configured to perform the actions of the processor.

These and other embodiments may each optionally include associating the quantity of references as the derived score for each of the plurality of files, determining whether the query includes a context, and if the query does not include the context, ranking the matching files so that the matching files are ranked in decreasing order of the derived score of each of the matching files.

In general, another aspect of the subject matter described in this specification may be embodied in systems that include a processor, and a computer-readable medium coupled to the processor and having instructions stored thereon, which, when executed by the processor, causes the processor to perform operations comprising deriving a score for each of a plurality of files based on a quantity of references to each file in source code of the remaining plurality of files. The instructions may also cause the process to perform operations comprising receiving a query identifying a source code tag, identifying matching files of the plurality of files that satisfy the query, generating a ranking of the matching files based on the derived scores, and providing the ranking.

In another general aspect, a computer readable medium is encoded with a computer program product which includes instructions that, when executed, operate to cause a computer to perform operations including deriving a score for each of a plurality of files based on a quantity of references to each file in source code of the remaining plurality of files, receiving a query identifying a source code tag, identifying matching files of the plurality of files that satisfy the query, generating a ranking of the matching files based on the derived scores, and providing the ranking.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate corresponding elements.

DETAILED DESCRIPTION

Figure 1:
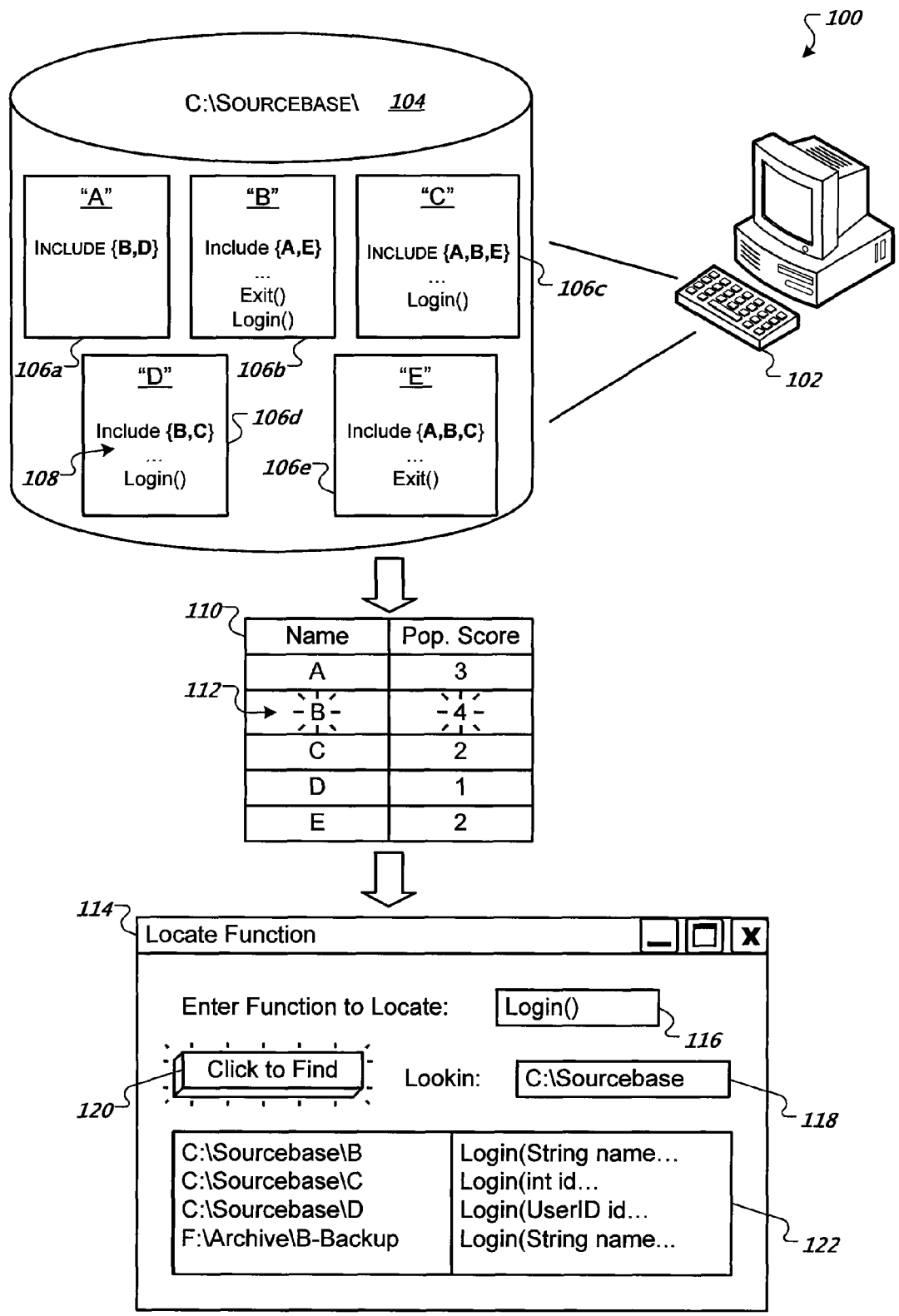
FIG. 1 is a block diagram illustrating source code retrieval.

FIG. 1 is a block diagram illustrating source code retrieval. The system 100 retrieves source code tag names (e.g., function names, global variables, typedefs, defines, or keywords) and associated tag definition information from a database. Some examples of associated tag information include the name/path of the source code file where the tag name is defined, a tag definition (e.g., how to use the tag, what information the tag represents), a description of the source code file, the first few lines or all of code associated with the tag name, or some combination of information. As described below, a computer may receive a request from a user for one or more potential matches of a source code tag name stored in a database, e.g., a code base stored on the directory C:\SOURCEBASE\. In some implementations, it may be that more than one instance of a tag name is in the database, for example, when a "LOGIN( )" function is defined in multiple files. The computer may rank the results by popularity or context, to name a few examples, to help the user select a match. The results may be presented with a snippet about the tag, or some other associated tag information.

The system 100 includes a computer 102 that interacts with a user. The computer 102 may include a database 104 containing source code files 106a-e. In some implementations, the computer 102 is multiple computers connected by a network. For example, a user may be logged into a laptop and access the database 104 located on a remote machine, e.g., a server. The computer 102 may be a server, a desktop, a laptop, a mainframe, a minicomputer, a personal digital assistant, or a combination of devices.

In some implementations, the database 104 is one repository containing all source code for a project, source code for multiple projects, and all source code associated with one entity (e.g., a programming team, or business). In other implementations, the database 104 may be split between multiple machines for redundancy, reduced latency, or separation of projects, to name a few examples. The database 104 may include multiple source code files 106a-e. The database 104 may be updated with new files and changes to files on the fly, daily, weekly, or at some other time. The database 104, for example, may include source code files for multiple programming languages, such as C++, Java, Python, or LISP, or source code files from only one language. For example, the database 104 may be multiple databases, one for each body of code, separated by programming language or project.

The source code files 106*a*-*e* includes one or more references, e.g., an INCLUDE statement 108 in source code file 106*d*. The INCLUDE statement 108 may reference other source code files in the database 104, standard libraries of the programming language, or source code files of another language, to name a few examples. In other implementations, the reference uses an IMPORT or a REQUIRE statement. The source code files 106*a*-*e* may contain one or more function definitions, variables, defines, programming statements, or some other combination of code. Each of the function definitions, variables, defines, and programming statements may be associated with a tag. For example, the tag may include information about the function definition, such as the source code file containing the function definition, a list of files that reference the function definition, a description of the function definition, the first few or all lines of code of the function, or some combination of them.

In some implementations, the computer 102 stores an index 110 (e.g. a look up table) referencing the source code files in the database 104. The index 110 includes the name and the popularity score of the files in the database 104. The index 110, for example, may also include information for the tags associated with the source code files. In some implementations, the popularity score of the source code files in the database 104 is based on the number of times another file in the database references that source code file. For example, source code file 106*b* is referenced in the INCLUDE statements for source code files 106*a*, 106*c*, 106*d*, and 106*e*, so the popularity score for source code file 106*b* is 4, as shown in row 112. In another example, source code file 106*d* is referenced only in source code file 106*a* and there has a popularity score of 1.

In other implementations, each tag has a popularity score based on the number of times each specific tag name is used. For example, if the "LOGIN ( )" function in source code file 106*b* is used 6 times in all of the source code files of database 104 and the "LOGIN ( )" function in source code file 106*c* is used 10 times, the "LOGIN ( )" tag for file 106*b* would have a popularity score of 6 and the "LOGIN ( )" tag for file 106*c* would have a popularity of 10.

The index 110 may be periodically updated, such as every second, twenty minutes, every hour, daily, or at even longer intervals. When source code files are added to or deleted from the database 104, or as a programmer types in a reference to a source code file while programming source code, the index 110 and the popularity scores may be updated. Backup copies of source code files may be kept in a database to allow the system 100 to reduce popularity scores accurately when source code files are deleted. The index 110, for example, may be re-created daily to reduce the chance of errors accumulating.

The system 100 may include a search window 114. In some implementations, the search window 114 includes a tag name text box 116, a look-in text box 118, a click to find button 120, and a search results box 122. A user may enter the tag name the user is looking for in the tag name text box 116 in order to search the database 104 for all occurrences of the tag name. The user may specify a subset of a database, or a specific database from a group of databases to conduct the search with the look-in text box 118. The subset, for example, may be a specific programming language, type of programming language, a local database, or a remote database. Selection of the click to find button 120 may present search results in the search results box 122. The search results box 122 may display the hits for the tag name and a snippet of information about each result (e.g., name and location of the source code file containing the result, a description of the result). The search results box 122, for example, may have a scroll bar or some other form of navigation for when all the results may not be displayed at one time.

In some implementations, the search results presented in the search results box 122 are ranked in order to provide a user with the results deemed most relevant at the top. The ranking may be based on a popularity score determined for each source code document in the database 104. For example, if the user is looking for a "LOGIN( )" function in "C:\SOURCEBASE\", the results would list source code file 106*b* first, 106*c* second, and source code file 106*d* third, based on respective popularity scores of 4, 2, and 1. The search results box 122 may display backup files in addition to the other hits for the tag name.

In other implementations, the search results may be ranked based on a popularity score and a context. The context may be specified by the look-in text box 118 as a specific database to search, or a specific programming language to search. For example, the search results would be limited to files in the specified database or files of the specified programming language, respectively. For example, if a user entered "Java" in the look-in text box 118, and "LOGIN( )" in the tag name text box 116, the only results displayed would be Java files that contain a "LOGIN( )" function.

The context may also be a source code file that is open, or a current directory that the user has open (i.e., is loaded or invoked, or the user currently editing), to name a few examples. A context based on a source code file that is open may be the programming language of the file, similar to specifying the language in the look-in text box 118 as mentioned above, or the references of the source code file (e.g., INCLUDE or IMPORT statements). In some implementations, the search results are ranked first by popularity score and second by context. For example, the files identified as search results are ranked by popularity and when there are multiple files with the same popularity score the context is used to determine how the files should be ranked. Files that are referenced in an open source code file may have a higher rank than files not referenced in the open source code file.

In other implementations, in a ranking based on an open source code file, the results that are referenced within the open file may be displayed first, with results not referenced in the open file displayed later or below. The subset of referenced results, for example, may be sorted based on popularity score. For example, if the user has source code file 106*a* open and searches for the function "LOGIN ( )" the results would display source code file 106*b* first, and 106*d* second, because they are in the INCLUDE statement of source code file 106*a*, and 106*b* has a higher popularity than 106*d*. Source code file 106*c* would be displayed third because it is not specifically referenced in source code file 106*a*.

For a context based on a current directory, results that are closer to the current directory, for example, may be displayed first, while results that are further away are displayed later. In some implementations, a directory is closer to another if the tree structured path between the two directories is less (e.g., sibling directories are closer together than cousins). In other implementations, a directory that is the descendant of the current directory is closer than a directory that is not a descendant.

Figure 2:
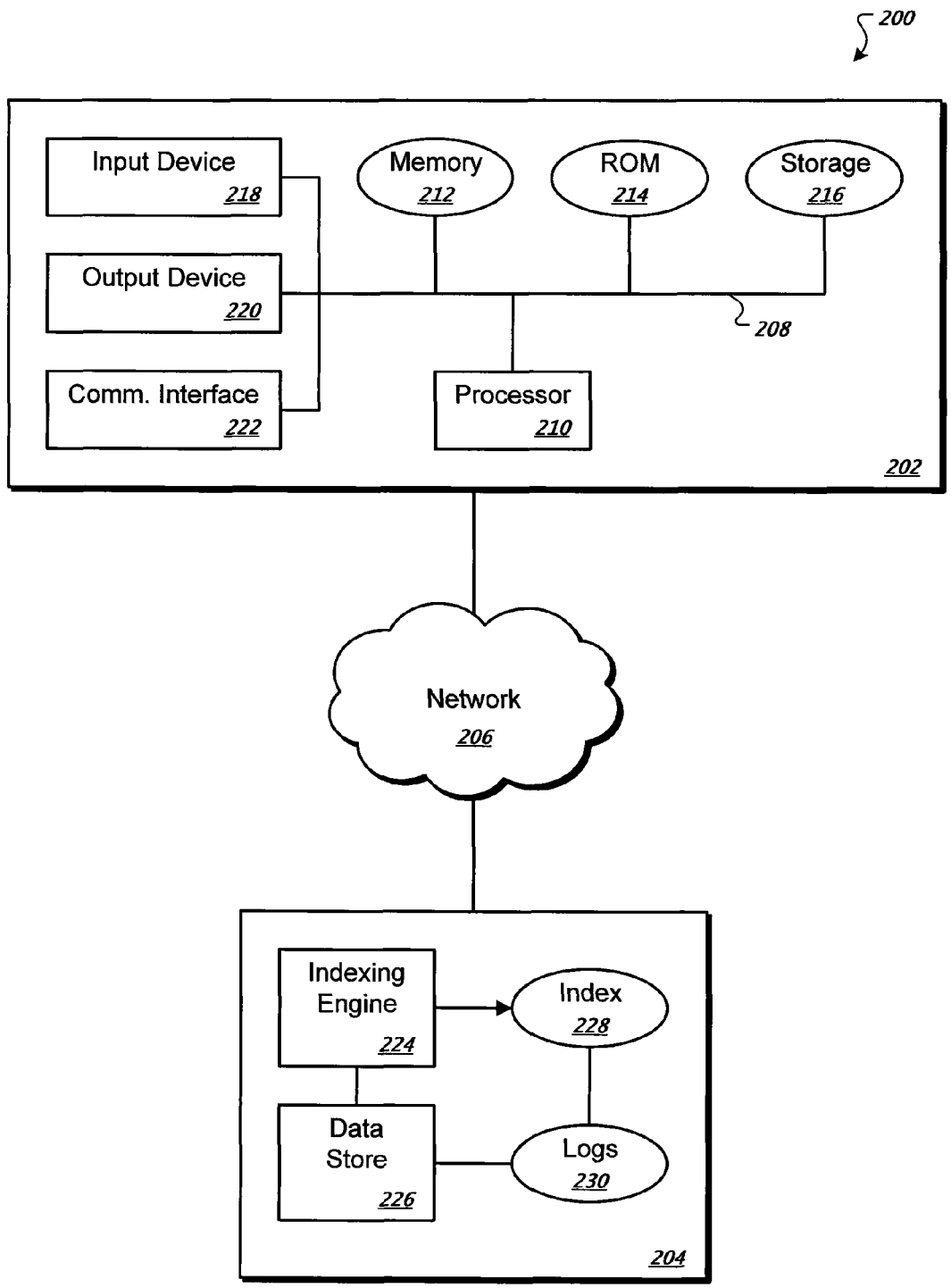
FIG. 2 is a block diagram illustrating a networked system.

FIG. 2 is a block diagram illustrating a networked system. The networked system 200 includes a client device 202 in communication with a server 204 over a data communication network 206. The network 206 may be a local area network (LAN), a wide area network (WAN), a telephone network, such as the Public Switched Telephone Network (PSTN), an intranet, the Internet, or any suitable combination of networks. For purposes of brevity, one client device 202 and one server 204 are illustrated as connected to the network 206. However, any suitable number of client devices 202 and servers 204 may be connected over the network 206. In addition, the client device 202 may perform the functions of the server 204 and the server 204 may perform the functions of the client device 202. The client devices 202 may include devices, such as mainframes, minicomputers, personal computers, laptops, personal digital assistants, or the like, capable of connecting to the network 206. The client device 202 may transmit data over the network 206 and/or receive data from the network 206 using a wired (e.g., copper, optical, etc.) and a wireless connection. The client device 202 or the server 204 may perform the functions of the computer 102 described in reference to FIG. 1 above.

The server 204 may provide a narrowed, ranked view of file information in response to search queries for tag definitions. The server 204 includes an indexing engine 224 that indexes tag information contained in a data store 226 to create an index 228 of the tags and their associated references. In some implementations, the data store 226 contains the database 104. The index 228 may, for example, be the index 110 described in reference to FIG. 1 above. The index 228 may alternatively be stored on the client device 202, or on both the client device 202 and the server 204, to name a few examples. The server 204 also includes a server, which serves as the actual search engine receiving the requests and performing the ranking. Log files 230 provide information regarding types of client applications that call the server 204, program languages against which the search queries are performed, and information to improve rankings of search results.

Figure 3:
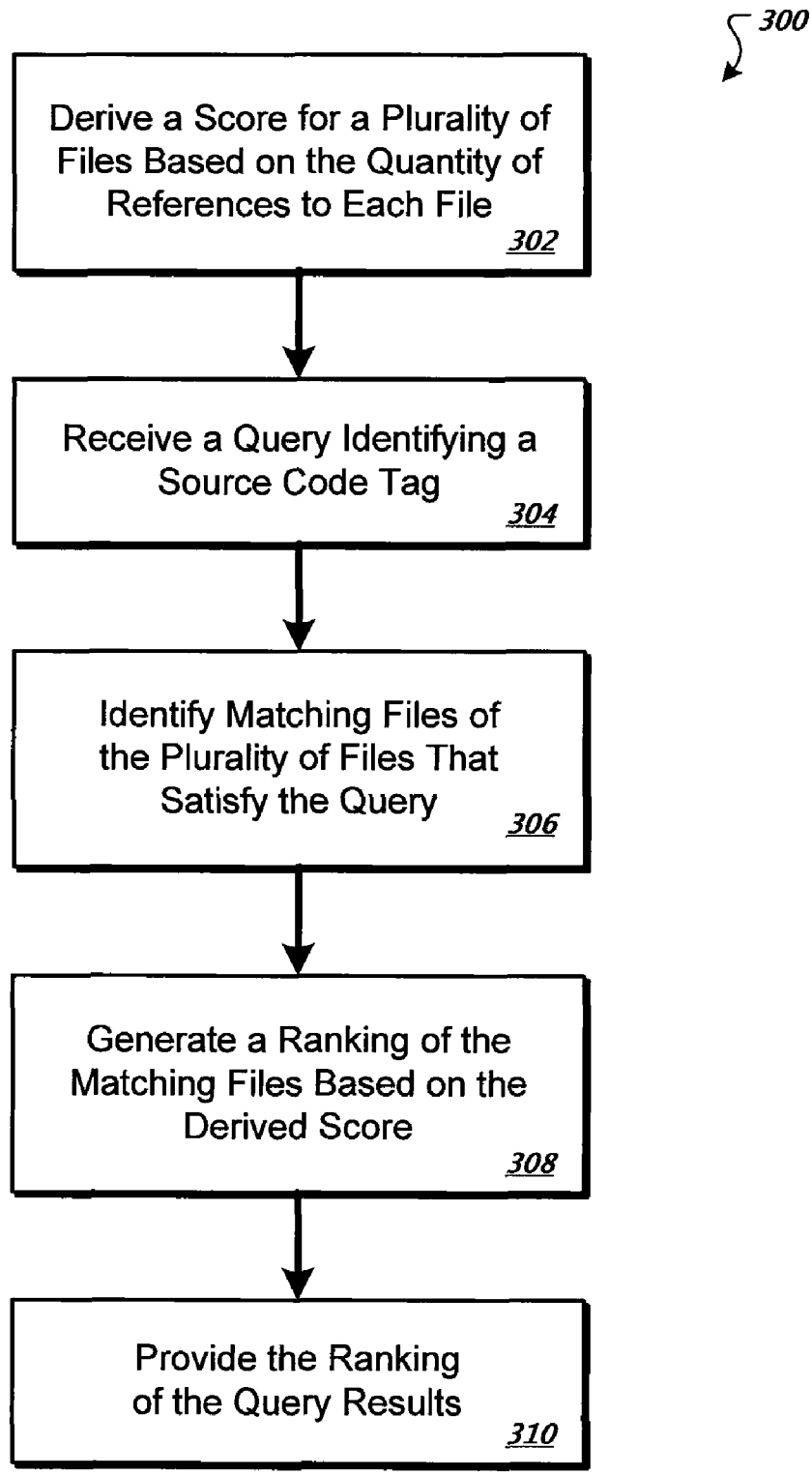
FIG. 3 is a flow diagram of an example process for source code retrieval.

FIG. 3 is a flow diagram of an example process 300 for source code retrieval. The process 300 may be performed on the system 100 or the system 200. For illustrative purposes, the process 300 shall be described in reference to the architectures shown in FIG. 1 and FIG. 2; although it should be understood the process 300 may be applied to different architectures other than FIG. 1 or FIG. 2. For purposes of brevity, in the description of the process 300, the computer 102 is the same device as the server 204, and the search window 114 is part of a process running on the client device 202.

The system 100 derives a score for a plurality of files based on the quantity of references to each file (302). For example, the indexing engine 224 creates the index 110 that contains the names of the source code files 106a-e in the database 104 and the popularity score of the files 106a-e. The derived score for each file may be based on the quantity of references to the file in the source code of the remaining plurality of files. The popularity score of the source code files 106a-e may be the number of times each of the files is referenced in another file in the database 104. For example, the popularity score of source code file 106c is 2 because it is in the INCLUDE statements of source code files 106d and 106e. If a reference is added or removed for one of the plurality of files, the derived scores may be updated to reflect the changes.

The system 100 receives a query identifying a source code tag (304). For example, the query is sent from the client device 202 to the server 204. A user of the client device 202 may enter a source code tag name of "LOGIN( )" in the search window 114 to initiate the query with selection of the click to find button 120. The query may reference a source code tag that is a function definition, a variable definition, or some other type of source code tag. In some implementations, the query includes context information to search, a programming language, or the type of variable the user is looking for (e.g., function definition, global variables, typedefs, defines). The context information may, for example, be provided by a file or folder that is open on the client device 202, by the look-in text box 118, or by a database that is currently in use.

The system 100 identifies matching files of the plurality of files that satisfy the query (306). For example, the server 204 identifies all source code files that match the criteria of the query, including any provided context information. For example, the source code files located in "C:\SOURCEBASE\" that contain a "LOGIN( )" tag are identified by the server 204. In some implementations, the provided context information limits the matching files to a specific programming language, or a directory.

The system 100 generates a ranking of the matching files based on the derived score (308). For example, the server 204 ranks the results of the query based on the popularity scores of the matching files. A provided context may, for example, be used in the ranking of the matching files. In some implementations, the files are ranked based on popularity score, and for any conflicts (e.g., two files with the same popularity score) the context is used to decide which file has a higher ranking. In other implementations, files are ranked based on context first, and popularity score second.

The system 100 provides the ranking of the query results (310). For example, the server 204 sends the query results and ranking of the query results to the client device 202 via the network 206. The query results may be graphically presented to the user, for example, with the search window 114, with the files with a higher ranking at the top and those with a lower ranking at the bottom. The search window 114 may provide a mechanism for the user to navigate through the query results when all of the results are not able to be displayed at one time. The user may select a match from the presented query results for use in a source code file. The source code file may be a new file if one is not already open, or the source code file may be one that is already open and was used to provide a context for the query, to name a few examples. In some implementations, if a new source code file is created, the new file has the same programming language as the selected query result.

Alternatively, the system 100 derives a score for a plurality of files based on the quantity of IMPORT and/or INCLUDE statements referencing each of the plurality of files (302). For example, the server 204 counts the number of unique IMPORT or INCLUDE statements referencing each file in the database 104 to use as the popularity score for the files. For example, if a file, e.g., source code file 106b, is referenced in another file, e.g., in the include statement 108 of source code file 106d, more than once it is only counted once. Alternatively, source code tags may have a popularity or derived score based on the number of calls to each function associated with the source code tag.

If a source code file in the database 104 is deleted, or an INCLUDE or IMPORT statement is removed, the derived scores for the plurality of files may be updated accordingly. Similarly, if an INCLUDE or IMPORT statement is added in a source code file, to either an existing source code file or a new source code file, the derived scores may be updated to reflect the new statement. In some implementations, a file has multiple popularity scores. For example, source code file 106b may have a popularity score of 4 for the database 104 "C:\SOURCEBASE\" and may have another popularity score when different databases or directories are searched (e.g., when multiple databases including "C:\SOURCEBASE\" or when the "C:\" directory are searched).

Alternatively, the system 100 determines if the query includes the name of an open file, a directory, or a language (306). For example, the client device 202 may have a source code file open and send context information relating to the open file to the server 204. The context may include the open file and information about the open file, e.g., references to other source code files in INCLUDE statements of the open file. The directory or database that the open file is located in may be used as a context, such that the server 204 searches for query results only located in that directory or database.

Alternatively, the system 100 may determine if the query includes a context (306). For example, the server 204 determines if the client device 202 provided context information with the query request. Context information may include a programming language, a database, a source code file, references of a currently open source code file(s), current working directory, or some combination of them, to name a few examples.

Upon determining the query does not include a context, the system 100 generates a ranking of the matching files in decreasing order of the derived score. For example, the server 204 ranks query results for the "LOGIN ( )" tag name by decreasing popularity score. Continuing the example, the source code file 106b is listed first, source code file 106c second, and source code file 106d third, based on popularity scores of 4, 2, and 1 respectively.

Upon determining the query includes a context, the system 100 generates a ranking of the matching files based on the context and derived score. For example, the server 204 ranks the results of the query based on the context first and the popularity score second. The results may be ranked such that all matching files that include the context are ranked in decreasing order of the derived score of the matching files above the matching files that do not include the context. The matching files that do not include the context may be ranked in decreasing order of derived score lower than the matching files that include the context. In some implementations, a query contains multiple contexts (e.g., both a directory and a programming language). Any files that do not have the context specified by the query may, for example, not be included in the ranking.

Contexts may, for example, have different priorities, such that files with a context of being referenced in an open file are displayed above files that have a context based on programming language. In some implementations, where there are multiple contexts, the server 204 identifies any results that match at least one context, and in other implementations, the server 204 identifies only matching files that have all specified contexts. In some implementations, where the context is that of an open file, files that are referenced in the open file are ranked first based on popularity score, files with a context relating to the programming language of the open file are ranked by popularity score second, and all other matching files are ranked third.

Implementations of the subject matter and the functional operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer program products, i.e., one or more modules of computer program instructions encoded on a tangible program carrier for execution by, or to control the operation of, data processing apparatus. The tangible program carrier may be a propagated signal or a computer readable medium. The propagated signal is an artificially generated signal, e.g., a machine-generated electrical, optical, or electromagnetic signal that is generated to encode information for transmission to suitable receiver apparatus for execution by a computer. The computer readable medium is a machine-readable storage device, a machine-readable storage substrate, a memory device, a composition of matter affecting a machine-readable propagated signal, or a combination of one or more of them.

The term "processing device" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, or declarative or procedural languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

While this specification contains many specific implementation details, these should not be construed as limitations on the scope of what may be claimed, but rather as descriptions of features that may be specific to particular implementations. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular implementations of the subject matter described in this specification have been described. Other implementations are within the scope of the following claims. For example, the actions recited in the claims may be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A machine-readable storage device having instructions stored thereon that, when executed by a computer, cause the computer to perform operations comprising:
    deriving a score for each of a plurality of files based on a quantity of references to each file in source code of other files of the plurality of files;
    receiving a query and data specifying a context, wherein the context is one of a file being edited, a name of a current directory, or a Programming language;
    identifying files of the plurality of files that satisfy the query, wherein the operation of identifying the files that satisfy the query comprises using an index of information associated with each of the plurality of files, wherein the information associated with a file includes a file name and a derived score;
    ranking the identified files in decreasing order of the derived score of each of the files, wherein files that do not match the context are ranked lower in the order than other identified files; and
    providing the ranked files in response to the query.

2. The machine-readable storage device of claim 1, wherein a reference to a file is one of an import statement or an include statement in the source code of the other files.

3. The machine-readable storage device of claim 1, wherein the index is updated in response to one or more changes associated with one or more of the plurality of files.

4. The machine-readable storage device of claim 3, wherein the index is updated by removing information associated with one of the plurality of files in response to receiving an indication that the file has been deleted.

5. The machine-readable storage device of claim 1, wherein the index is re-created at regular time intervals.

6. The machine-readable storage device of claim 1, wherein the information associated with a file further includes information for tags associated with the file.

7. The machine-readable storage device of claim 6, wherein the associated tag information comprises one or more of a tag name, a tag definition, a description of the file, and one or more code lines associated with the tag.

8. The machine-readable storage device of claim 6, where the associated tag information further comprises a tag popularity score based on the number of times the tag name is used within the source code of the other files.

9. A system, comprising:
    a machine-readable storage device having instructions stored thereon; and
    a data processing apparatus operable to execute the instructions to perform operations comprising:
        deriving a score for each of a plurality of files based on a quantity of references to each file in source code of other files of the plurality of files;
        receiving a query and data specifying a context, wherein the context is one of a file being edited, a name of a current directory, or a Programming language;
        identifying files of the plurality of files that satisfy the query, wherein the operation of identifying the files that satisfy the query comprises using an index of information associated with each of the plurality of files, wherein the information associated with a file includes a file name and a derived score;
        ranking the identified files in decreasing order of the derived score of each of the files, wherein files that do not match the context are ranked lower in the order than other identified files; and
        providing the ranked files in response to the query.

10. The system of claim 9, wherein a reference to a file is one of an import statement or an include statement in the source code of the other files.

11. The system of claim 9, wherein the index is updated in response to one or more changes associated with one or more of the plurality of files.

12. The system of claim 9, wherein the index is updated by removing information associated with one of the plurality of files in response to receiving an indication that the file has been deleted.

13. The system of claim 9, wherein the index is re-created at regular time intervals.

14. The system of claim 9, wherein the information associated with a file further includes information for tags associated with the file.

15. The system of claim 14, wherein the associated tag information comprises one or more of a tag name, a tag definition, a description of the file, and one or more code lines associated with the tag.

16. The system of claim 15, where the associated tag information further comprises a tag popularity score based on the number of times the tag name is used within the source code of the other files.

17. A computer-implemented method comprising:

deriving a score for each of a plurality of files based on a quantity of references to each file in source code of other files of the plurality of files;

receiving a query and data specifying a context, wherein the context is one of a file being edited, a name of a current directory, or a Programming language;

identifying, by operation of a processing device, files of the plurality of files that satisfy the query, wherein the operation of identifying the files that satisfy the query comprises using an index of information associated with each of the plurality of files, wherein the information associated with a file includes a file name and a derived score;

ranking the identified files in decreasing order of the derived score of each of the files, wherein files that do not match the context are ranked lower in the order than other identified files; and providing the ranked files in response to the query.

18. The method of claim 17, wherein a reference to a file is one of an import statement or an include statement in the source code of the other files.

19. The method of claim 17, wherein the index is updated in response to one or more changes associated with one or more of the plurality of files.

20. The method of claim 17, wherein the index is updated by removing information associated with one of the plurality of files in response to receiving an indication that the file has been deleted.

21. The method of claim 17, wherein the index is re-created at regular time intervals.

22. The method of claim 17, wherein the information associated with a file further includes information for tags associated with the file.

23. The method of claim 22, wherein the associated tag information comprises one or more of a tag name, a tag definition, a description of the file, and one or more code lines associated with the tag.

24. The method of claim 23, where the associated tag information further comprises a tag popularity score based on the number of times the tag name is used within the source code of the other files.

\* \* \* \* \*